(No Model.) 2 Sheets—Sheet 1.
J. J. BURKE.
LAWN MOWER KNIFE SHARPENER.
No. 563,558. Patented July 7, 1896.
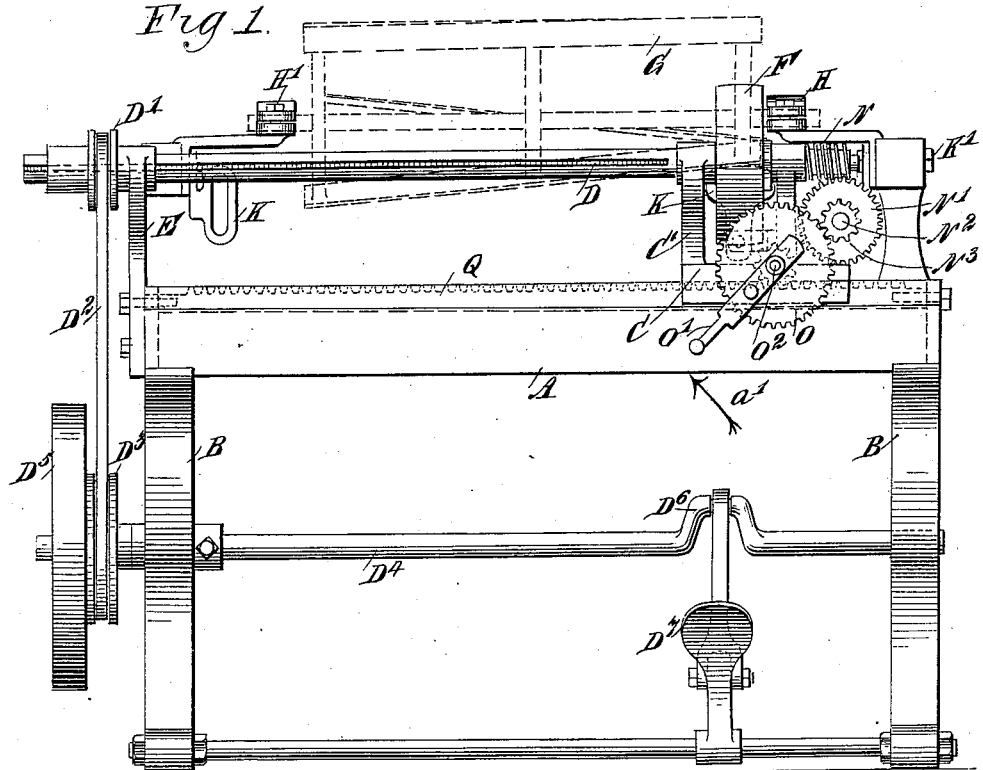
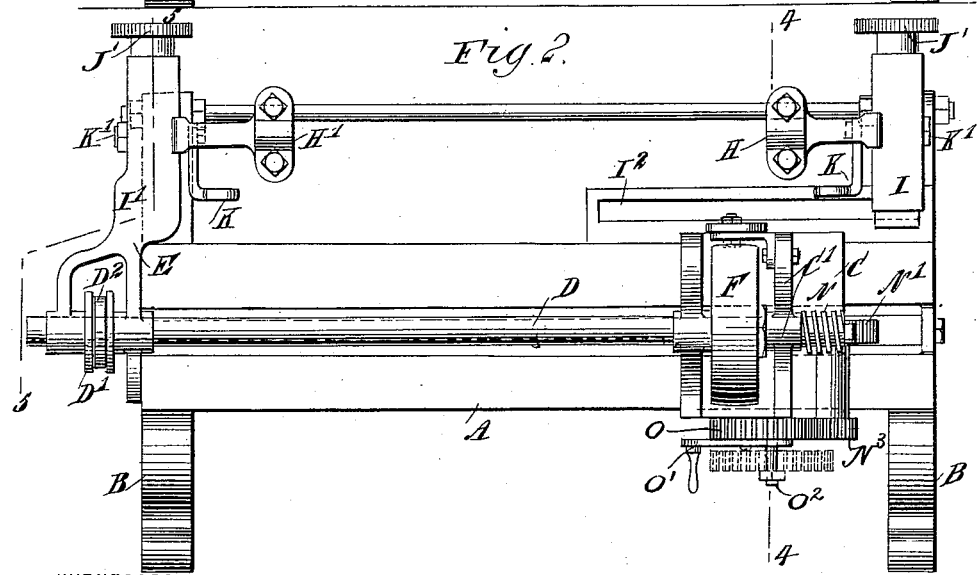
WITNESSES:
Paul Johst
Theo. G. Hoster
INVENTOR
J. J. Burke
BY Munn & Co.
ATTORNEYS.

(No Model.) 2 Sheets—Sheet 2.
J. J. BURKE.
LAWN MOWER KNIFE SHARPENER.
No. 563,558. Patented July 7, 1896.
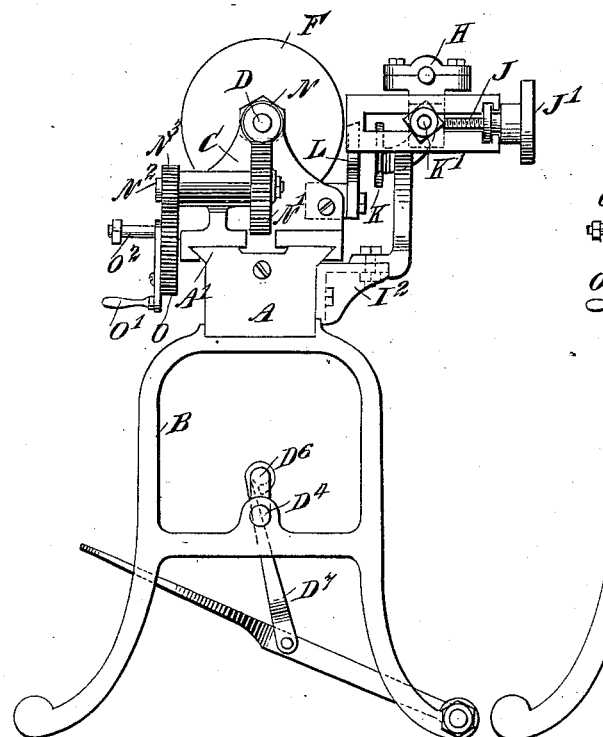
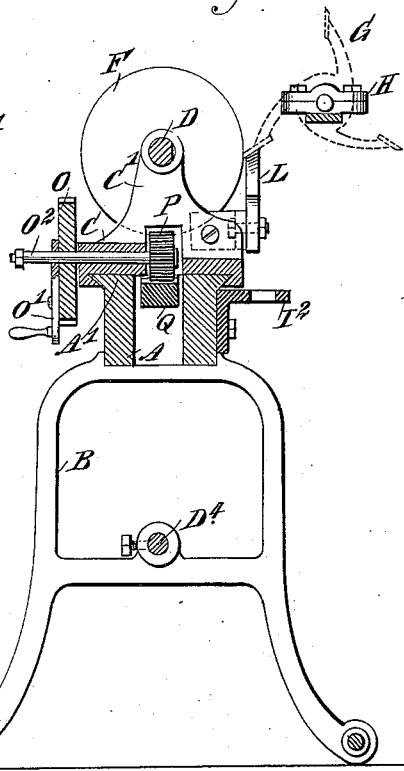
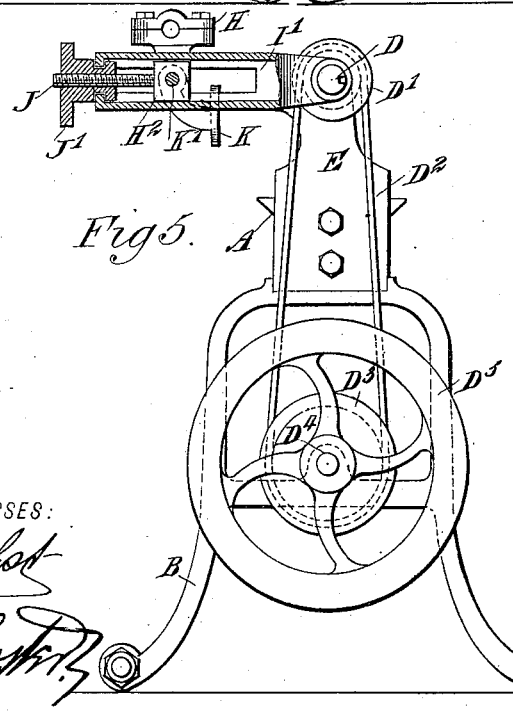
WITNESSES:
Paul Johst
Theo. G. Hoster
INVENTOR
J. J. Burke
BY Munn & Co
ATTORNEYS.

UNITED STATES PATENT OFFICE.

JOSEPH J. BURKE, OF WILBER, NEBRASKA.

LAWN-MOWER-KNIFE SHARPENER.

SPECIFICATION forming part of Letters Patent No. 563,558, dated July 7, 1896.

Application filed October 16, 1895. Serial No. 565,839. (No model.)

*To all whom it may concern:*

Be it known that I, JOSEPH J. BURKE, of Wilber, in the county of Saline and State of Nebraska, have invented a new and Improved Lawn-Mower-Knife Sharpener, of which the following is a full, clear, and exact description.

The object of the invention is to provide a new and improved sharpener or grinding-machine, more especially designed for conveniently, rapidly, and accurately grinding the knives of lawn-mowers.

The invention consists principally of adjustable bearings or supports for the knives to be ground, a movable knife-rest, and a revoluble grinding-wheel, both rest and wheel being mounted on a longitudinally-movable carriage.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a side elevation of the improvement. Fig. 2 is a plan view of the same. Fig. 3 is an end elevation of the same. Fig. 4 is a transverse section of the same on the line 4 4 of Fig. 2, and Fig. 5 is a similar view of the same on the line 5 5 of Fig. 2.

The improved grinding-machine is provided with a bed A, mounted on suitable legs B, and provided on its top with longitudinally-extending guideways A', on which is mounted to slide longitudinally a carriage C, formed with a bearing C' for one end of a shaft D, journaled at its other end in a forked bearing E, secured to the end of the bed A. On the shaft D is arranged a pulley D', held between the members of the forked bearing E, so that the shaft can slide longitudinally through said pulley, but the latter is connected by key and groove with the shaft D to rotate the latter.

The pulley D' is connected by a belt $D^2$ with a pulley $D^3$, secured on a crank-shaft $D^4$, journaled in suitable bearings in the legs B, and on the said crank-shaft $D^4$ is held a flywheel $D^5$, and a crank-arm $D^6$ is formed on the shaft to connect with a treadle $D^7$ to permit the operator to impart a rotary motion to said shaft $D^4$. The motion of the latter is transmitted by the pulleys $D^3$ and D' and belt $D^2$ to the shaft D, so as to rotate the latter.

On the shaft D at the carriage C is secured a grinding-wheel F, of emery or other suitable material, and adapted to grind the cutting edges of either the revoluble knife G or the straight edge of the stationary knife of the lawn-mower throughout the length of the said cutting edges. The revoluble knife G (shown in dotted lines in Figs. 1 and 4) has its ends journaled in bearings H and H', provided with blocks $H^2$, fitted to slide transversely in guideways I and I', respectively, of which the guideway I is held longitudinally adjustable on a guideway $I^2$, secured to the rear of the bed A, while the other guideway, I', is a rearward extension of the bearing E, as shown in the drawings. Screw-rods J engage the blocks $H^2$ to move the latter in the guideways I and I', said screw-rods being each engaged by a nut J', mounted to turn loosely in the rear ends of the guideways, as is plainly illustrated in Fig. 5. Thus, by turning the nuts J', the blocks $H^2$ and consequently the bearings H' H', with the knife G supported thereon, can be adjusted transversely according to the diameter of the knife, so as to bring the longitudinal cutting edges of individual knives in contact with the peripheral surface of the grinding-wheel F. (See Fig. 4.)

The straight stationary knife of the lawn-mower is adapted to be fastened at its ends to hangers K, fastened by bolts K' to the blocks $H^2$, so that the adjustment of the latter by the nuts J' and screw-rods J brings the cutting edge of the straight stationary knife in proper position relative to the peripheral surface of the grinding-wheel F. The knives to be ground are adapted to rest on the top of a knife-rest L, held adjustable on the carriage C and located directly in the rear of the grinding-wheel F and close to the peripheral surface thereof to properly support the knife while the grinding-wheel sharpens the cutting edge thereof. The carriage C is adapted to travel longitudinally on the bed A, to move the revolving grinding-wheel F along the cutting edge of the knife throughout the length thereof to properly sharpen the cutting edge.

Now in order to impart a longitudinal feeding motion to the carriage C, the following device is provided: On the end of the shaft D next to the grinding-wheel F is formed or secured a worm N in mesh with a worm-wheel N', secured on the rear end of a transversely-extending shaft $N^2$, journaled in suitable bearings on the carriage C. On the front end of this shaft $N^2$ is held a pinion $N^3$, normally in mesh with a gear-wheel O, held to slide on and to turn with a shaft $O^2$, journaled in suitable bearings in the carriage C, as plainly shown in Fig. 4. On the front face of the gear-wheel O is secured a crank-arm O', to permit the operator to move the said gear-wheel O transversely in and out of mesh with the pinion $N^3$, and when out of mesh to permit of turning the gear-wheel O to rotate the shaft $O^2$ by hand. On the inner end of this shaft $O^2$ is secured a pinion P in mesh with a longitudinally-extending rack Q, secured to the bed A.

Now it will be seen that when the machine is in operation and the wheel O is in mesh with the pinion $N^3$ then the rotary motion of the shaft D is transmitted by the worm N and worm-wheel N' to the shaft $N^2$, and the latter by the pinion $N^3$ and gear-wheel O imparts a rotary motion to the shaft $O^2$ to cause the pinion P to roll on the rack Q, so that the carriage C is moved from the right to the left. The rotary motion of the shaft D at the same time causes the grinding-wheel F to grind the cutting edge of the knife, so that the entire length of the cutting edge is treated and sharpened. It will further be seen that as the spirally-arranged knife-blade of the knife G rests on the top of the rest L and the latter travels with the carriage C it causes a turning of the knife G, so as to hold the cutting edge always in proper relation to the peripheral surface of the grinding-wheel F. When the end of the knife-blade is reached, the operator ceases to work the treadle $D^7$ and moves the gear-wheel O forward on its shaft $O^2$ and out of mesh with the pinion $N^3$. The operator now turns the crank-arm O' in the direction of the arrow a', so that the pinion P rolls on the rack Q, thereby moving the carriage C from the left to the right back to the starting position. The cutting edge of the knife G is then treated in the manner above described.

It will be seen that the machine is very simple and durable in construction, can be easily manipulated, and permits a ready adjustment of the knife-supporting device, so as to always bring the cutting edge in proper relation to the grinding-wheel to sharpen the knives very accurately.

Having thus fully described my invention, I claim as new and desire to secure by Letters Patent—

1. A grinding-machine of the class described, comprising a longitudinally-movable carriage, a shaft journaled at one end in said carriage and having longitudinal movement therewith, a bearing in which the other end of the shaft is journaled, a pulley arranged on the shaft to rotate the same, the said shaft having longitudinal movement with the said carriage and adapted to slide longitudinally through the said pulley, a grinding-wheel held on said shaft, a feed mechanism for said carriage driven from the longitudinally-movable shaft, and a rest for the knife-blade held adjustable on said carriage and moving therewith, substantially as shown and described.

2. A grinding-machine of the class described, comprising a longitudinally-movable carriage, a shaft journaled at one end in said carriage and at its opposite end in suitable bearings, a pulley arranged on the shaft to rotate the same and held between the bearings, the said shaft having longitudinal movement with the carriage and adapted to slide longitudinally through the said pulley, a grinding-wheel held on the said shaft, a feed mechanism for the carriage driven from the longitudinally-movable shaft, a rest for the knife-blade held on said carriage and moving therewith, and adjustable bearings or supports for the ends of the knife to be ground, substantially as shown and described.

3. In a grinding-machine of the class described, a grinding-wheel, a carriage carrying said grinding-wheel, a rest for the knife-blade held on said carriage, and adjustable bearings or supports for the ends of the knife to be ground, the said adjustable bearings being each provided with a block, transversely-extending guideways in which the said blocks are fitted to slide and a longitudinally-extending guideway in which one of said transversely-extending guideways is longitudinally adjustable, and means for adjusting said blocks and guideway, substantially, as shown and described.

4. A grinding-machine of the class described, comprising a support for the ends of the knives to be ground, a bed provided with longitudinally-extending guideways, a carriage mounted to slide on said guideways, a rest for the knife-blade held on the carriage, a shaft journaled at one end in said carriage and having longitudinal movement therewith, the said shaft being provided with a worm, a grinding-wheel secured to the said shaft, a longitudinally-extending rack on the bed of the machine, and intermediate mechanism between the said worm and rack for moving the said carriage, substantially as shown and described.

5. A grinding-machine of the class described, comprising adjustable supports for the knife to be ground, a bed provided with longitudinally-extending guideways, a carriage mounted to slide on said guideways, a shaft journaled at one end in said carriage and moving therewith, a grinding-wheel secured on the said shaft at the carriage, a worm at the carriage end of the shaft, a transversely-extending shaft journaled in said carriage and provided with a worm-wheel in mesh with the said worm, a gear-wheel held to slide on and turn with a shaft journaled in the said carriage, the said gear-wheel being in mesh with a pinion on the transversely-extending worm-wheel shaft, a pinion carried on the shaft of the gear-wheel, a longitudinally-extending rack secured to the bed of the machine and with which the pinion on the shaft of the gear-wheel meshes, and means for moving the said gear-wheel in and out of mesh with the pinion on the worm-wheel shaft, as and for the purpose set forth.

JOSEPH J. BURKE.

Witnesses:
J. N. VAN DUYN,
W. H. DAVIS.